Aug. 6, 1968    G. E. GREY    3,395,814
BALE WAGON
Filed Feb. 7, 1966    4 Sheets-Sheet 2
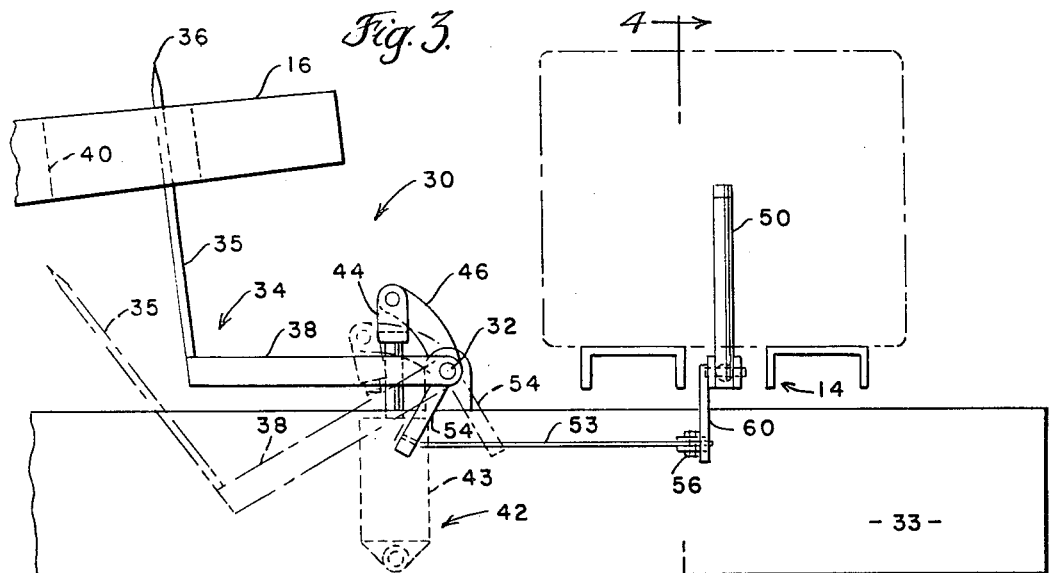
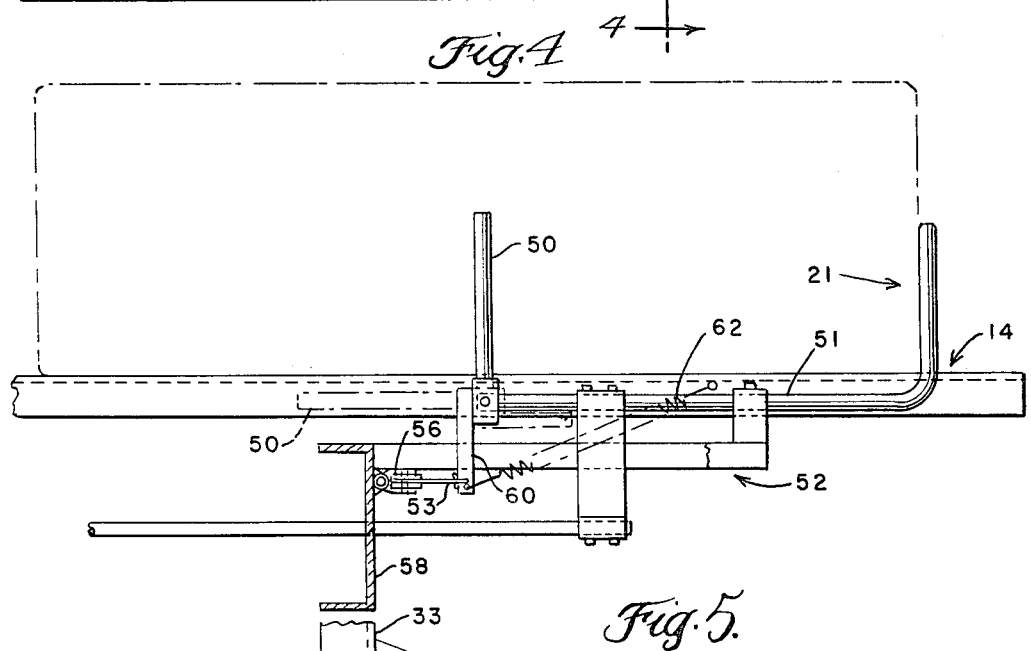
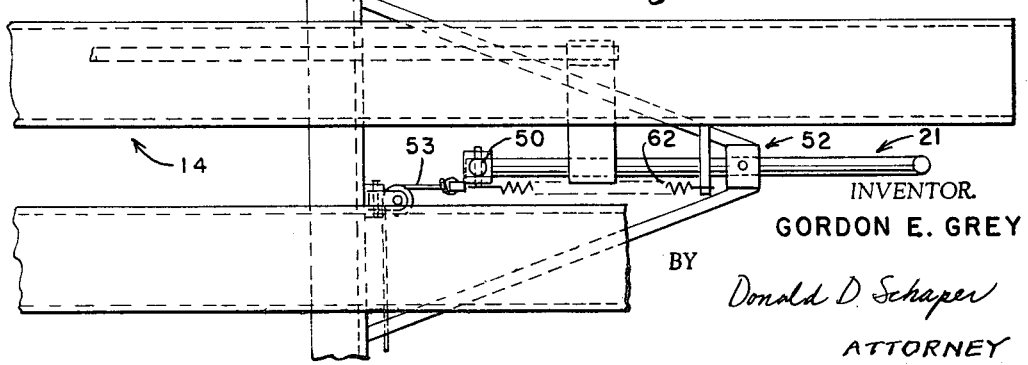
INVENTOR.
GORDON E. GREY
BY
Donald D. Schaper
ATTORNEY Aug. 6, 1968 G. E. GREY 3,395,814
BALE WAGON
Filed Feb. 7, 1966 4 Sheets-Sheet 3
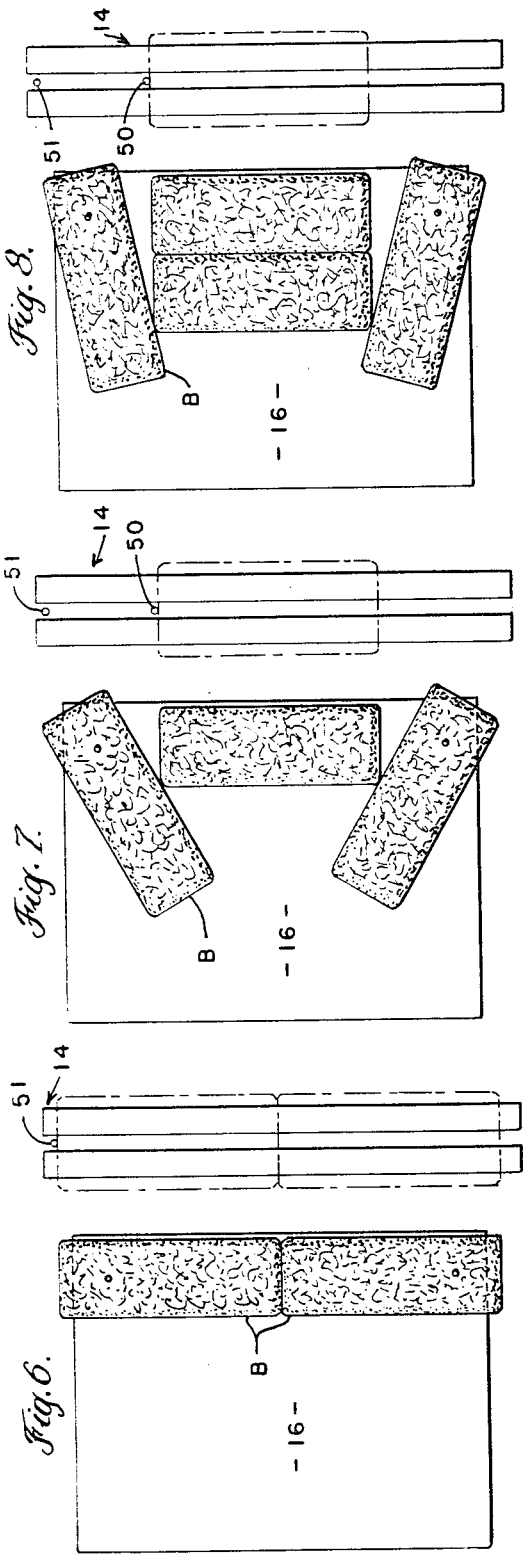
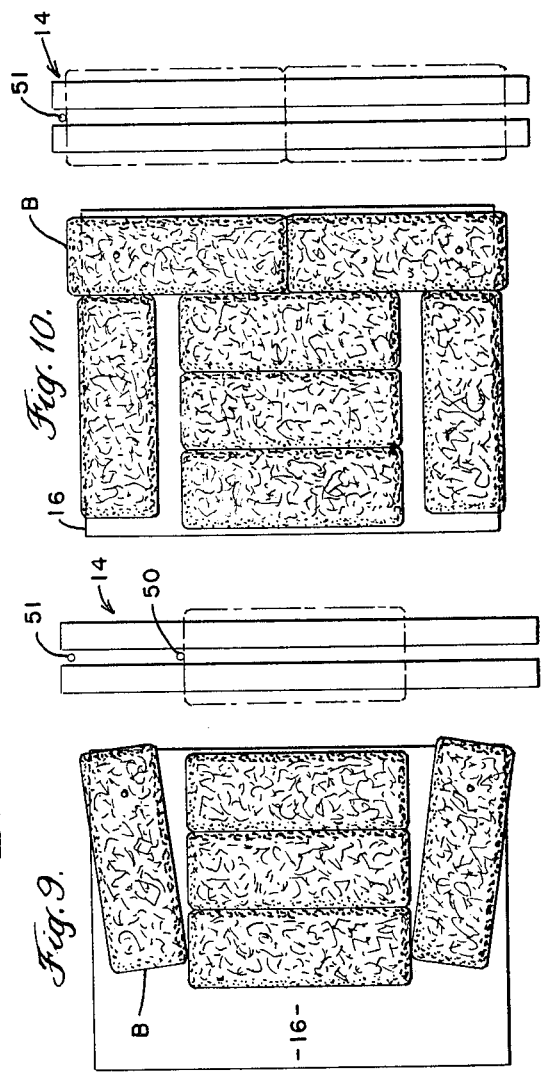
INVENTOR.
GORDON E. GREY
BY
Donald D. Schaper
ATTORNEY

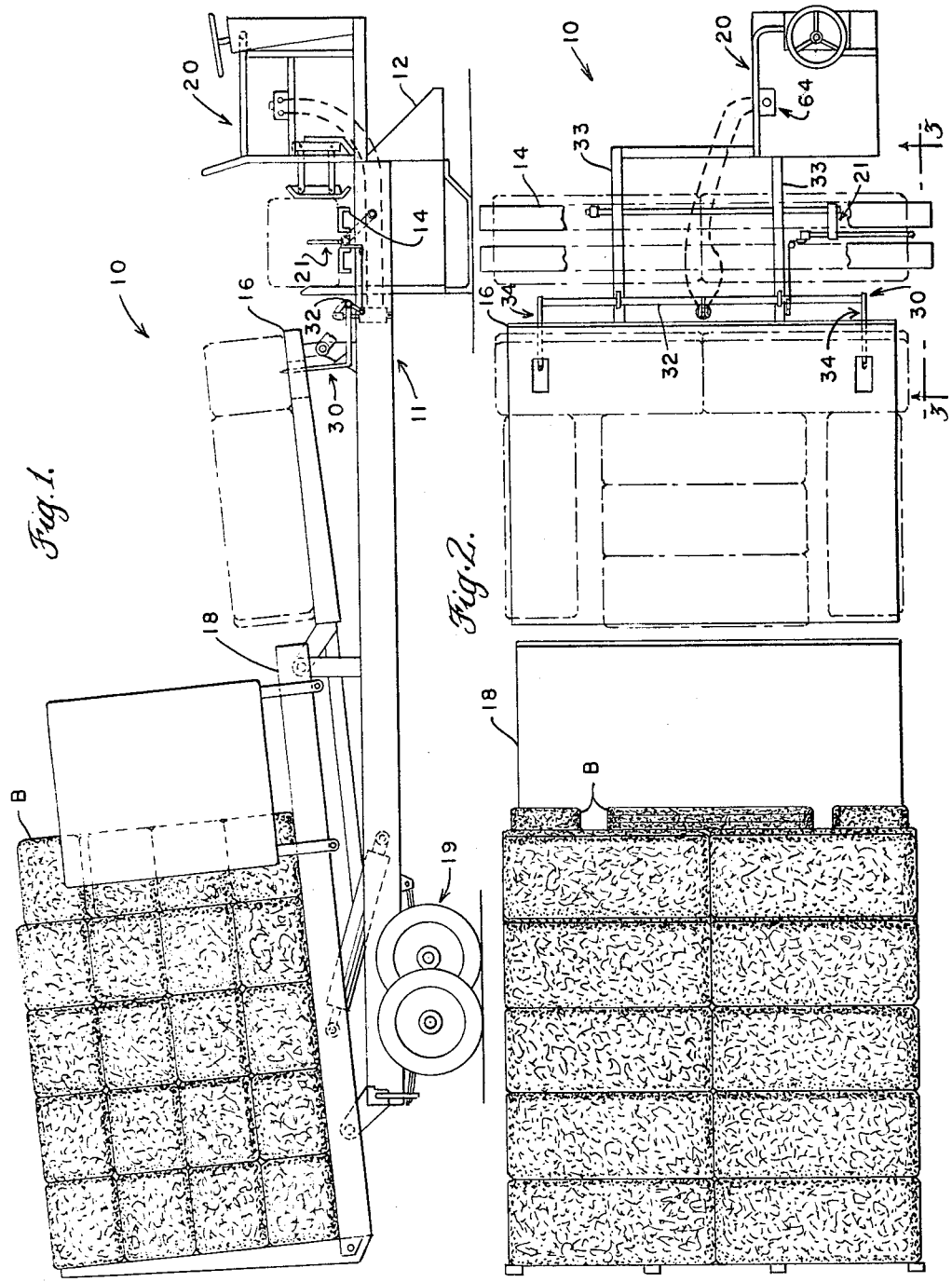

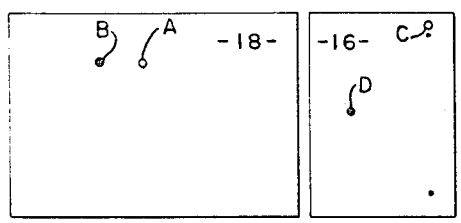 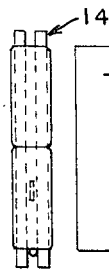 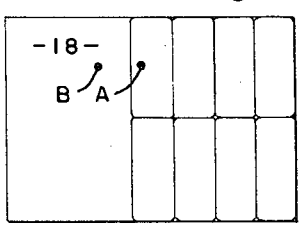 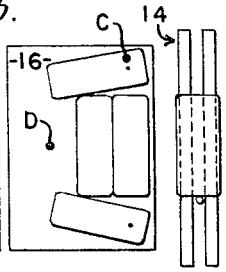
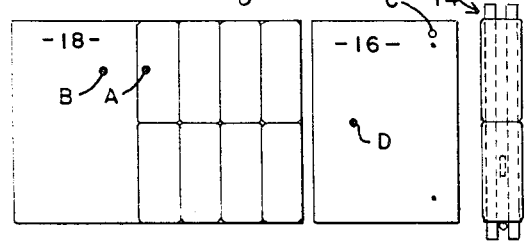 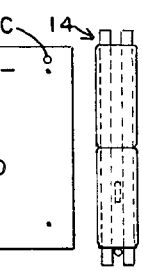 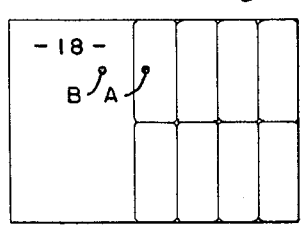 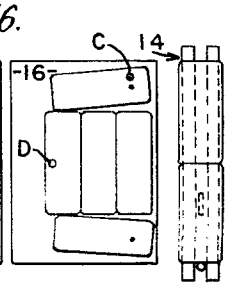
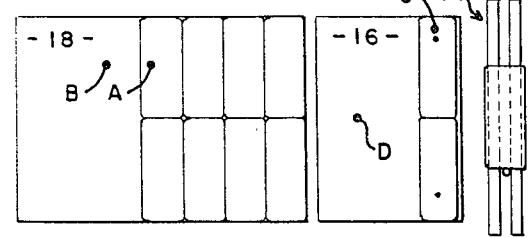 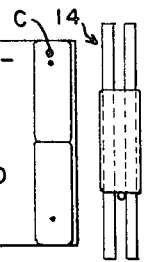 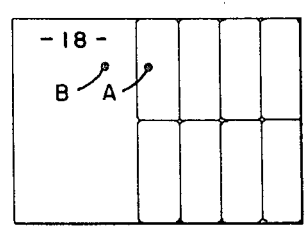 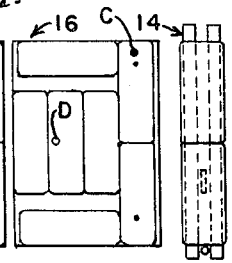
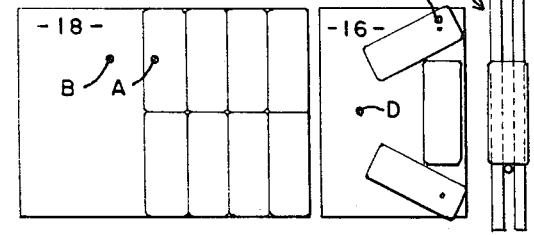 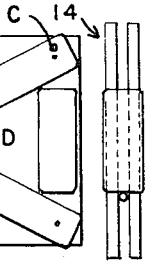 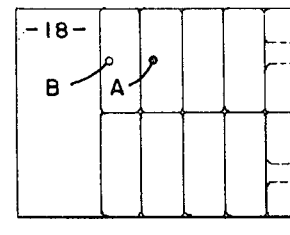 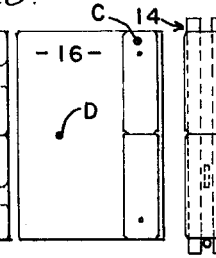
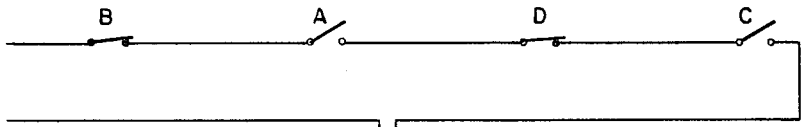
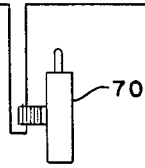

United States Patent Office 3,395,814
Patented Aug. 6, 1968

3,395,814
BALE WAGON
Gordon E. Grey, Kingsburg, Calif., assignor to Sperry Rand Corporation, New Holland, Pa., a corporation of Delaware
Filed Feb. 7, 1966, Ser. No. 525,644
11 Claims. (Cl. 214—6)

ABSTRACT OF THE DISCLOSURE

A bale wagon which is adapted to automatically stack bales on a load-carrying portion thereof and having a mechanism for turning selected bales during the stacking process so that vertical stacks can be formed in two different patterns.

---

It is common in completely automatic bale wagons to form vertical stacks of bales on the wagon, with all of the bales in a given stack being oriented in the same direction relative to the load-carrying bed. The vertical stacks on the wagon become horizontal layers when deposited on the ground for storage. Since all of the bales in each horizontal layer are arranged with their longitudinal axes in the same direction and each horizontal layer lies directly over the next adjacent layer, the bales tend to separate along vertical planes and to fall over after being in storage for a period of time.

Normally, to prevent the bales from falling over in storage, a so-called tie-in stack is formed in each wagon load. In the past, the tie-in stack has been formed, at least partially, by hand. This is, of course, time consuming and requires considerable extra work on the part of the operator.

Accordingly, one object of this invention is to provide a bale wagon with a means for automatically forming a tie-in stack.

Another object of this invention is to provide an automatic bale wagon with means for forming a vertical stack of bales in either of two patterns.

Another object of this invention is to provide bale interlocking means which is particularly suitable for a wagon of the three-bed type.

A further object of this invention is to provide an interlocking means which is efficient and of simplified construction.

A still further object of this invention is to provide an interlocking means which forms a tie-in stack having bales arranged with their longitudinal axes in a plurality of directions relative to the load-carrying bed.

Other objects of this invention will be apparent hereinafter from the specification and from the recital in the appended claims.

In the drawings:

FIG. 1 is an elevational view of a bale wagon illustrating an application of this invention. Four conventional stacks of bales and a fifth tie-in stack are shown on the load-carrying bed. Bales are shown in dot-and-dash lines on the receiving bed and on the transfer bed.

FIG. 2 is a plan view of FIG. 1, with the two bales on the receiving bed and a tie-in stack on the transfer bed indicated in dot-and-dash lines.

FIG. 3 is an enlarged fragmentary elevational view taken as indicated by the lines 3—3 of FIG. 2, and showing the interlocking means including the bale tie trip lever and the pivot tines. The pivot tines are shown in solid lines in the operative position and in dot-and-dash lines in the nonoperative position.

FIG. 4 is a section taken on the line 4—4 of FIG. 3 and showing the relative positions of the bale tie trip lever and the normal two bale trip.

FIG. 5 is a plan view of FIG. 4.

FIGS. 6–10 show the formation of a tie-in stack, with FIG. 6 showing two bales on the transfer bed just prior to the actuation of the interlocking means.

FIG. 7 shows a first single bale which has been deposited on the transfer bed after actuation of the interlocking means and which has caused the first two bales to pivot rearwardly on the pivot tines.

FIG. 8 shows the locations of the bales after a second single bale has been placed on the transfer bed.

FIG. 9 shows the third single bale in place on the transfer bed.

FIG. 10 shows the completed tie-in stack, the final two bales having been placed on the transfer bed after the interlocking means has been moved to the nonoperative position.

FIGS. 11–18 show a second embodiment of this invention wherein a bale actuated automatic switch arrangement is employed for actuating the interlocking means.

FIG. 19 shows the switch circuit with the switches in their normal positions prior to contact by the bales, and the circuit including a solenoid valve for operating the hydraulic drive for the interlocking means.

Referring now to the drawings by numerals of reference and particularly to FIGS. 1 and 2, the bale wagon 10 comprises a chassis structure 11, a bale loader 12, a receiving bed 14, a transfer bed 16, and a load-carrying bed 18, having a partial load of bales thereon. The wagon is supported adjacent its rear end by a pair of offset wheels 19 on each side of the chassis 11. The wagon is shown in FIGS. 1 and 2 as being of the self-propelled type (motor and forward suspension not shown) with an operator's platform 20 on the forward end of the wagon. The bale loading and stacking mechanisms on the wagon are identical with the Bale Wagon shown in the U.S. Patent to Grey, No. 2,848,127, issued Aug. 19, 1958. Reference to the patent may be made for the details of these mechanisms and their operations, as well as for other information for understanding the unified operation of the Grey machine.

With reference to FIGS. 1–5, the interlocking mechanism 30 of this invention is shown mounted on chassis 11 and comprises a rockshaft 32 pivotally mounted to longitudinally extending chassis members 33, 33, of chassis 11, and a pair of pivot tines 34, 34, on opposite ends of rockshaft 32 (see FIG. 3). Each pivot tine 34 comprises a first leg 35 having a pointed end 36, and a second leg 38 rigidly connected to the rockshaft 32. Rockshaft 32 is adapted to be pivoted through an arc from a lower position (shown in dot-and-dash lines in FIG. 3) below the transfer bed to an upper position (shown in solid lines in FIG. 3) where pointed end 36 of leg 35 projects through an opening 40 in transfer bed 16. A hydraulic actuator 42 consisting of a cylinder 43 and a piston 44 is connected to rockshaft 32 through a link 46.

A trip mechanism 21 is mounted on chassis 11 to actuate hydraulic lifting means (not shown) connected to receiving bed 14. Trip mechanism 21 comprises a bale tie trip lever 50 pivotally mounted on a trip rod 51 which is slidably mounted on bracket 52 and operatively connected to the hydraulic lifting means. A cable 53 extends between a radially extending arm 54 on rockshaft 32 around a sheave 56 on chassis cross member 58 to an element 60 connected to bale tie trip lever 50. When rockshaft 32 is pivoted to move the pivot tines 34 to their operative position, lever 50 will be in a vertical position, shown in solid lines in FIG. 4, as a result of the action of cable 53 on element 60. When rockshaft 32 is pivoted to move the pivot tines 34 to their nonoperative position, cable 53 becomes slack and a spring 62 serves to return lever 50 to a horizontal position shown in dot-and-dash lines in FIG. 4.

A switch 64 on the operator's platform may be used to control a solenoid valve (not shown) operatively connected to hydraulic actuator 42 for operating the bale interlocking mechanism 30.

A modified switch arrangement which is bale actuated is shown in FIGS. 11–19 and may be employed in lieu of the manually actuated switch 64 on the operator's platform. As shown in FIG. 19, the automatic switching arrangement comprises a normally open switch A on the load-carrying platform, a normally closed switch B on the load-carrying platform, a normally closed switch D on the transfer bed, and a normally open switch C also on the transfer bed. Switches A, B, C, and D are arranged in an electrical circuit connected to a source of power, with the circuit including a solenoid valve 70 operatively connected to hydraulic motor 42. The switches in FIGS. 11–19 are shown diagrammatically, and it will be apparent to one skilled in the art that any conventional electrical switch with a spring loaded actuator will operate in the arrangement shown.

In normal operation of the bale wagon shown, bales are loaded from the field onto the receiving bed, one bale at a time. The bales are moved across the receiving bed by a cross conveyor (not shown), and when two bales have been fully loaded on the receiving bed, trip mechanism 21 is actuated by the pressure of the first bale received against the vertical end of rod 51; the bales are then deposited on the transfer bed 16 by the hydraulic lifting means (not shown). Successive rows of two bales are placed on the transfer bed 16 until 8 bales have been received and the bed is filled. When the transfer bed 16 has been filled, a trip mechanism (not shown) on the transfer bed 16 actuates hydraulic tilting means which causes the transfer bed to pivot upwardly and deposit the 8 bales on the load-carrying bed 18 in a vertical stack with the bales arranged in a first pattern. The first pattern is comprised of bales with their longitudinal axes all extending transversely to the longitudinal axis of the bale wagon. Normally, when four vertical stacks of bales arranged in the first pattern have been deposited on load-carrying bed 18, it is desirable to form a vertical stack in a second pattern, known as a tie-in stack.

A tie-in stack is formed as shown in FIGS. 6–10. In the first embodiment, the operator actuates switch 64 to place the interlocking means in operation when two bales have been placed on transfer bed 16, as shown in FIG. 6. When the interlocking means is actuated, pivot tines 34 move upwardly through openings 40 in transfer bed 16 and into the two bales on the transfer bed. At the same time that pivot tines 34 are moved upwardly, cable 53 moves bale tine trip lever 50 to its vertical position, as shown in FIG. 3. With lever 50 in the vertical position, the receiving bed will be tripped with only a single bale on the receiving bed; as the first single bale is placed on the transfer bed 16, the two bales thereon will be caused to pivot rearward on tines 34, as shown in FIG. 7. Single bales are then successively placed on transfer bed 16, as shown in FIGS. 8 and 9. With transfer bed 16 loaded, as shown in FIG. 9, the operator moves switch 64 to the off position, so that the tines 34 are withdrawn from the bales and trip lever 50 is returned to its horizontal position. A two-bale row of bales is then formed on receiving bed 14 and placed on the transfer bed in the normal manner to complete the second pattern of bales, or tie-in stack, as shown in FIG. 10. The tie-in stack is then deposited on the load-carrying bed in the same manner as are the stacks of the first pattern. With reference to FIG. 10, it will be noted that in the second pattern of bales formed when the interlocking means is used, there is one less bale than in the first pattern of bales. It will be apparent that when the bales are deposited on the ground by the load-carrying bed the tie-in stack serves to hold the stack together and prevent toppling of the bales.

In the second embodiment of the invention, as shown in FIGS. 11–19, the interlocking means functions in the same manner as described above. In this embodiment, however, a tie-in stack is formed automatically after four stacks of bales have been placed on the load-carrying bed. As shown in FIGS. 11 and 19, there are two normally open switches, A and C, and two normally closed switches B and D, the open switches in FIGS. 11–18 being designated by circles and the closed switches by black dots. When the fourth vertical stack is moved into place on the load-carrying bed 18, normally open switch A is closed by contact of the stack with the switch actuator (not shown). When two additional bales are placed on the transfer bed 16, as shown in FIG. 13, all of the switches are closed and the interlocking means is actuated. Thus, single bales are delivered to the transfer bed 16, as shown in FIGS. 14, 15, and 16. When the third single bale is delivered on the transfer bed 16, normally closed switch D is opened by the first single bale, and the interlocking means is deactuated. A normal two-bale row is then received on the receiving table and placed on the transfer bed to complete the tie-in stack. When the tie-in stack is delivered to the load-carrying bed by transfer bed 16, normally closed switch D will be opened by the rearmost stack and will remain open as the load-carrying bed is filled. It will be seen from the foregoing that the tie-in stack is formed automatically once, each time the load-carrying bed is filled.

While this invention has been described in connection with a particular embodiment thereof, it will be understood that it is capable of modification, and this application is intended to cover any variations, uses, or adaptations following, in general, the principles of the invention, and including such departures from the present disclosure as come within known or customary in the art to which the invention pertains, and as fall within the scope of the invention or the limits of the appended claims.

Having thus described my invention, what I claim is:

1. A bale wagon comprising: a chassis structure; bed means on said chassis structure; stacking means for forming vertical stacks of bales on said bed means in a first pattern; interlocking means operatively engageable with bales on said stacking means for rotating a plurality of selected bales, each one about a separate pivot axis, during the formation of a bale stack; and means to actuate said interlocking means when it is desired to form a tie-in vertical stack of bales in a second pattern having bales arranged with their longitudinal axes in a plurality of directions relative to the bed means.

2. A bale wagon, as recited in claim 1, wherein said bed means comprises a receiving bed, transfer bed, and a load-carrying bed; said stacking means comprises loading means for depositing a row of bales on said receiving bed, lifting means for delivering rows of bales from said receiving bed to said transfer bed to form a layer of bales thereon, and tilting means for delivering layers of said bales to said load-carrying bed to form a stack of bales thereon; and said interlocking means is located on said chassis adjacent said transfer bed.

3. A bale wagon, as recited in claim 2, wherein said interlocking means comprises a rockshaft pivotally mounted on said chassis and extending generally perpendicular to the longitudinal centerline of said chassis, a pair of pivot tines are spaced on opposite ends of said rockshaft, said interlocking means is movable from an inoperative to an operative position, and said pivot tines project above said transfer bed for engagement with the bales when said interlocking means is in the operative position.

4. A bale wagon, as recited in claim 3, wherein said loading means comprises bale actuated trip means which is operable at a first position when said interlocking means is nonoperatively engaged with said stacking means and is operable at a second position when said interlocking means is operatively engaged.

5. A bale wagon, as recited in claim 4, wherein each of said pivot tines is generally L-shaped and has first and second legs, said first leg is connected to said rockshaft, and said second leg extends generally perpendicular to said first leg and is adapted to project above said transfer bed for engagement with bales thereon.

6. A bale wagon, as recited in claim 1, wherein said second pattern consists of less bales than said first pattern.

7. A bale wagon, as recited in claim 1, wherein said means for actuating said interlocking means comprises a hydraulic drive means and a manually actuated switch for controlling said drive means.

8. A bale wagon, as recited in claim 1, wherein said means for actuating said interlocking means comprises a hydraulic drive means and bale actuated means for controlling said drive means.

9. A bale wagon comprising: a chassis structure; bed means on said chassis structure; stacking means for forming vertical stacks of bales on said bed means; interlocking means for forming pivotal connections between a selected plurality of bales and said stacking means whereby each bale of said selected plurality of bales may be simultaneously pivoted during the formation of a layer of bales prior to movement of said layer into the stack; said interlocking means comprising tine means adapted to project into said bales; and means for actuating said interlocking means.

10. In a bale wagon, as recited in claim 9, wherein said bed means comprises a receiving bed, transfer bed, and a load-carrying bed; said stacking means comprises loading means for depositing a row of bales on said receiving bed, lifting means for delivering rows of bales from said receiving bed to said transfer bed to form a layer of bales thereon, tilting means for delivering layers of said bales to said load-carrying bed to form a stack of bales thereon; and said interlocking means is located on said chassis adjacent said transfer bed.

11. A bale wagon, as recited in claim 9, wherein said interlocking means comprises a rockshaft pivotally mounted on said chassis structure, and said tine means comprises a pair of pivot tines spaced on opposite ends of said rockshaft.

References Cited

UNITED STATES PATENTS

| | | | |
|---|---|---|---|
| 2,880,889 | 4/1959 | Huffington | 214—1 |
| 3,246,774 | 4/1966 | Bishop | 214—6 |

ROBERT G. SHERIDAN, *Primary Examiner.*

R. J. SPAR, *Assistant Examiner.*